(12) United States Patent
Matsumoto

(10) Patent No.: US 8,380,953 B2
(45) Date of Patent: Feb. 19, 2013

(54) CONTROL APPARATUS, METHOD FOR CONTROLLING THE CONTROL APPARATUS, AND STORAGE MEDIUM

(75) Inventor: Akihiro Matsumoto, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 330 days.

(21) Appl. No.: 12/887,376

(22) Filed: Sep. 21, 2010

(65) Prior Publication Data

US 2011/0078401 A1    Mar. 31, 2011

(30) Foreign Application Priority Data

Sep. 25, 2009    (JP) ................. 2009-220830

(51) Int. Cl.
*G06F 13/10* (2006.01)

(52) U.S. Cl. ...................................... 711/162

(58) Field of Classification Search ......... None
See application file for complete search history.

(56) References Cited

U.S. PATENT DOCUMENTS 7,240,234 B2 *    7/2007    Morita et al. .............. 714/4.11

FOREIGN PATENT DOCUMENTS

JP          2002-278704 A       9/2002

* cited by examiner

*Primary Examiner* — Duc Doan
(74) *Attorney, Agent, or Firm* — Canon USA Inc. IP Division

(57) ABSTRACT

A method completes background processing within a shortest possible time without degrading an efficiency of main processing executed in a system. The system includes a control apparatus including a plurality of hard disks and a memory controller configured to control an access to the hard disk. The memory controller changes a unit of the background processing, which is changed according to a state of a plurality of storage devices. In changing the unit of processing, the memory controller monitors the presence or absence of an access for the main processing coming from a main controller, and changes the unit of the background processing to a first unit of processing or to a second unit of processing, which is smaller than the first unit of processing according to a result of the monitoring.

6 Claims, 8 Drawing Sheets

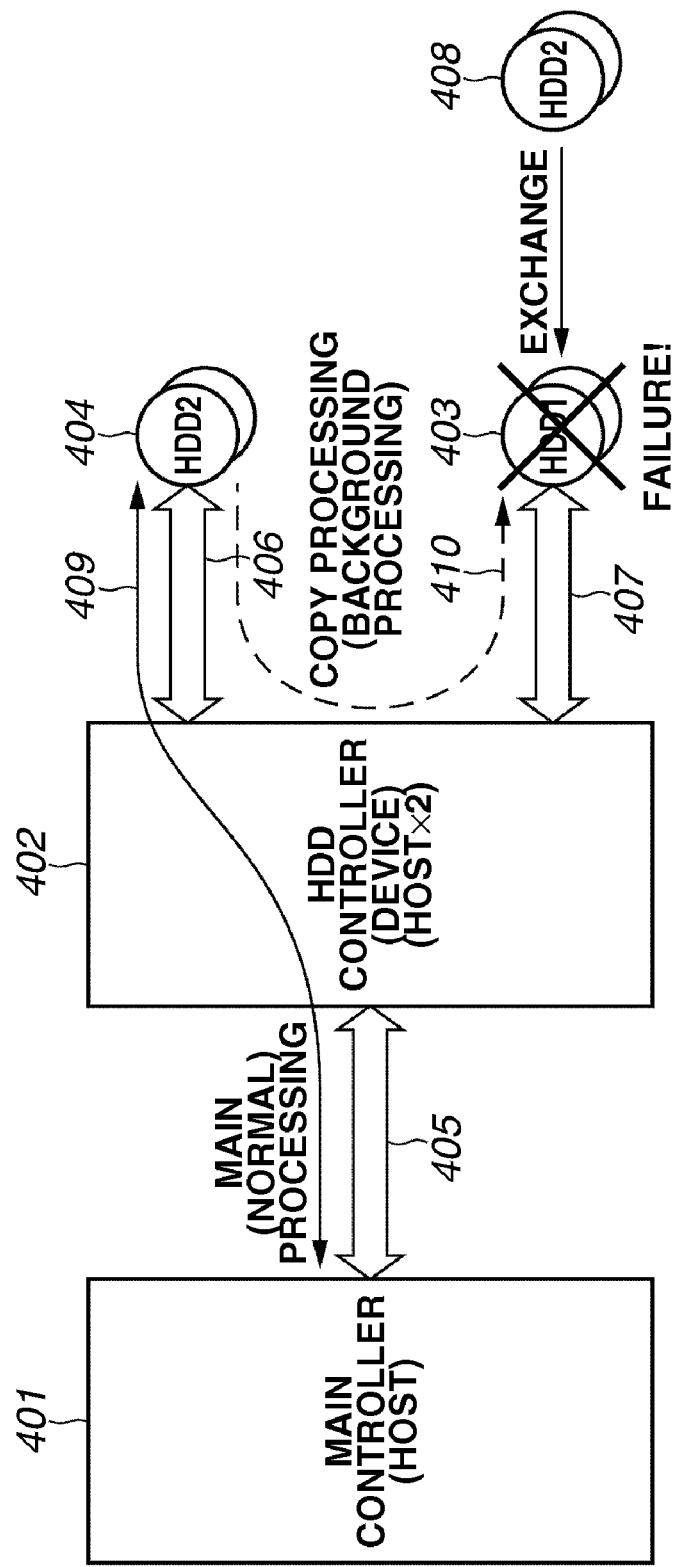

FIG.4A PATTERN P1
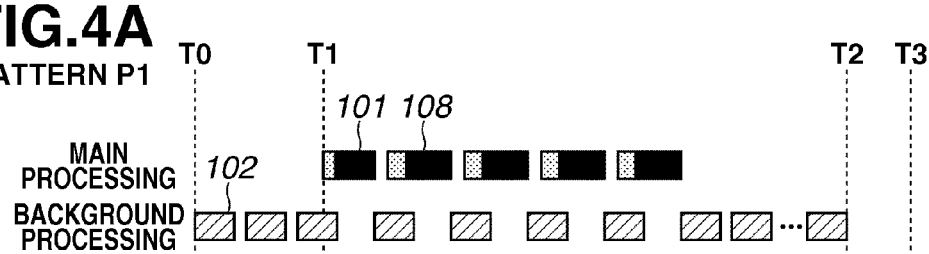
FIG.4B PATTERN P2
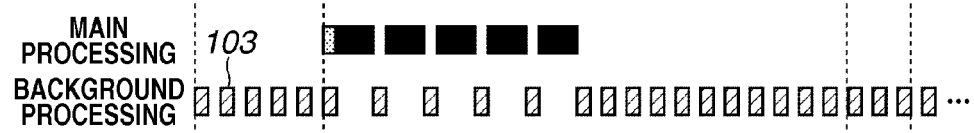
FIG.4C PATTERN P3
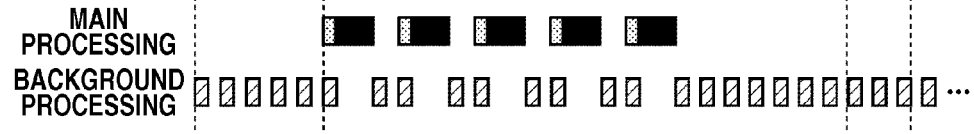
FIG.4D PATTERN P4
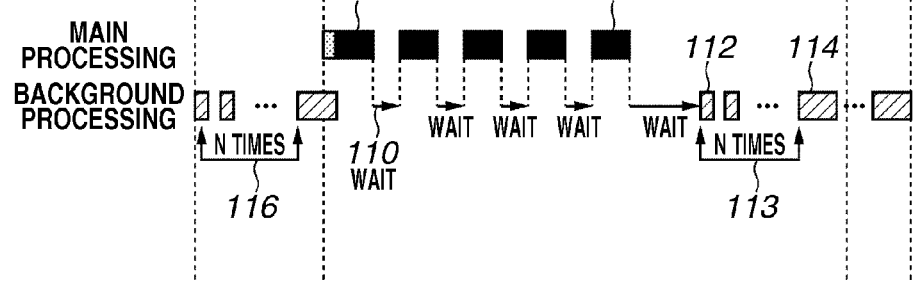

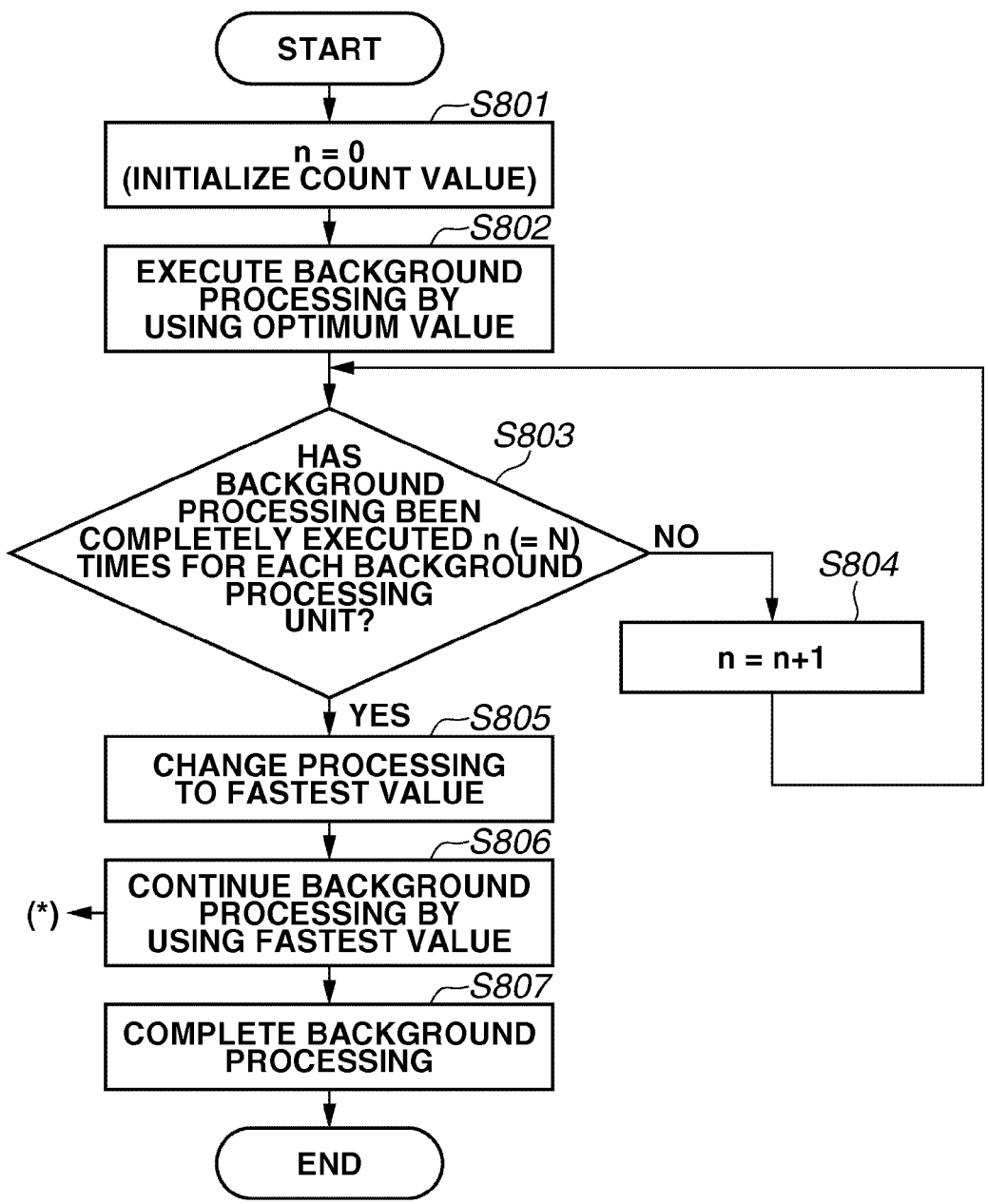

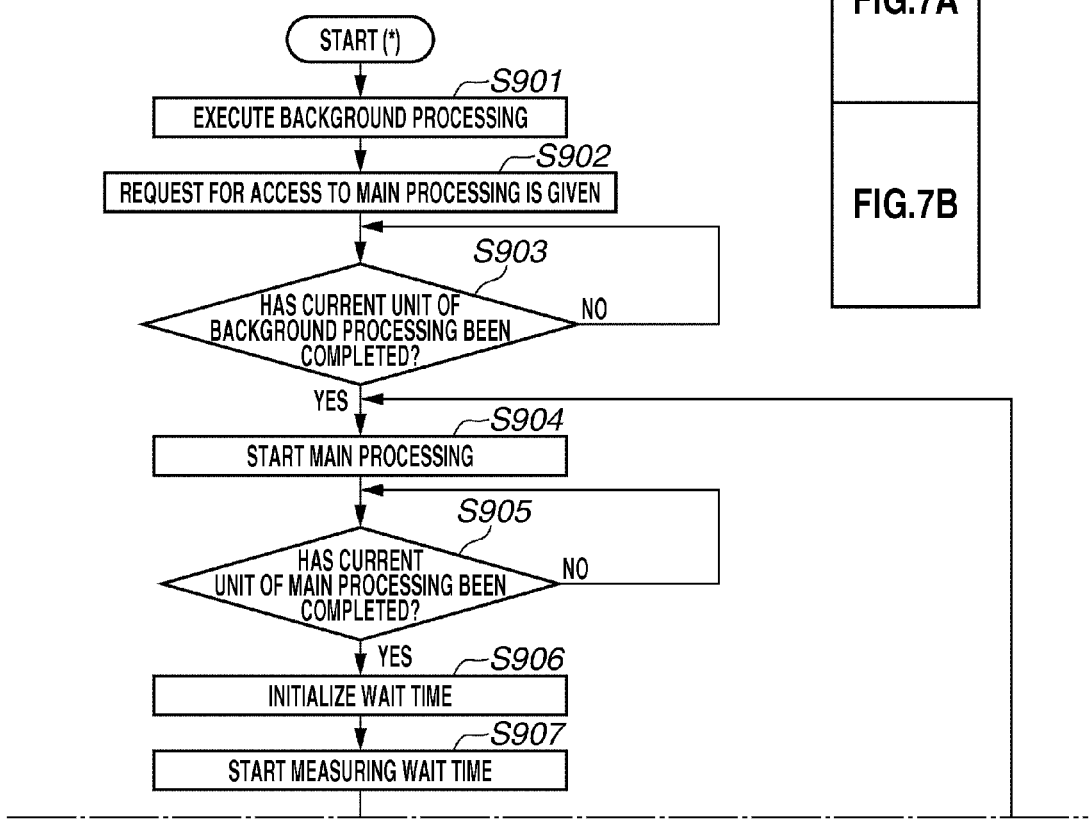

CONTROL APPARATUS, METHOD FOR CONTROLLING THE CONTROL APPARATUS, AND STORAGE MEDIUM

BACKGROUND OF THE INVENTION

1. Field of the Invention

The present invention relates to a memory control apparatus configured to control a plurality of storage devices.

2. Description of the Related Art

A conventional disk array system including a plurality of storage devices shares data stored on each storage device in order to handle failure that may occur on any storage device. Furthermore, various apparatuses, such as a data processing apparatus or an image processing apparatus uses a disk array system described above.

A conventional printing apparatus that uses a disk array system of this type executes the background processing on a relatively low priority basis, when print processing and background processing are executed in which the background processing is executed for purposes other than printing, by using a shared storage device, such that main processing (in this case, the print processing) is not affected, or within a fixed ratio of processing. However, depending on a content of such background processing, it may be necessary to execute the background processing on a priority basis higher than that of the main processing or to complete the background processing within shortest processing time to prevent the efficiency of the main processing from degrading.

In a mirroring (redundant array of independent disks (RAID1) system, which is intended to implement high data security, failure may occur on one hard disk drive (HDD). If one HDD has failed, the failed HDD is exchanged with a new HDD and a content of the data stored on the other normally functioning HDD is copied onto the newly mounted HDD. The copy processing described above is usually executed on background.

If the normally functioning HDD fails during the background processing, the data security function cannot work. In this case, data stored on the normally functioning HDD cannot be reproduced. Accordingly, in executing background processing to restore the apparatus from an abnormal state to a normal state as in the above-described case or the like, it is necessary to complete the processing as soon as possible.

Japanese Patent Application Laid-Open No. 2002-278704 discusses a method for determining a priority order of executing main processing and background processing based on information stored in a priority table, which stores priority information for executing main processing and background processing. However, in executing the method discussed in Japanese Patent Application Laid-Open No. 2002-278704, it is necessary to execute complicated operations for generating a priority table and registering the generated priority table on the storage device even when the number of background processing is not large.

In addition, in controlling the priority order based on information stored on the priority table that is registered on the storage device, it is necessary to execute complicated operations for determining the order of processing a plurality of given access requests on an access requesting apparatus. The above-described problem may arise as long as memory apparatuses are used that can be connected in an array similar to a case where an HDD is used as the storage device.

SUMMARY OF THE INVENTION

The present invention is directed to a method for completing background processing in a shortest processing time with a relatively simple control configuration and without degrading the processing efficiency of main processing executed in a system.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the present invention.

FIG. 3 illustrates an exemplary configuration of a disk array system.

FIGS. 4A through 4D are timing charts illustrating a sequence executed by a memory control apparatus.

FIG. 6 is a flow chart illustrating an example of processing executed by the memory control apparatus.

DESCRIPTION OF THE EMBODIMENTS

Various exemplary embodiments, features, and aspects of the invention will be described in detail below with reference to the drawings.

Figure 1:
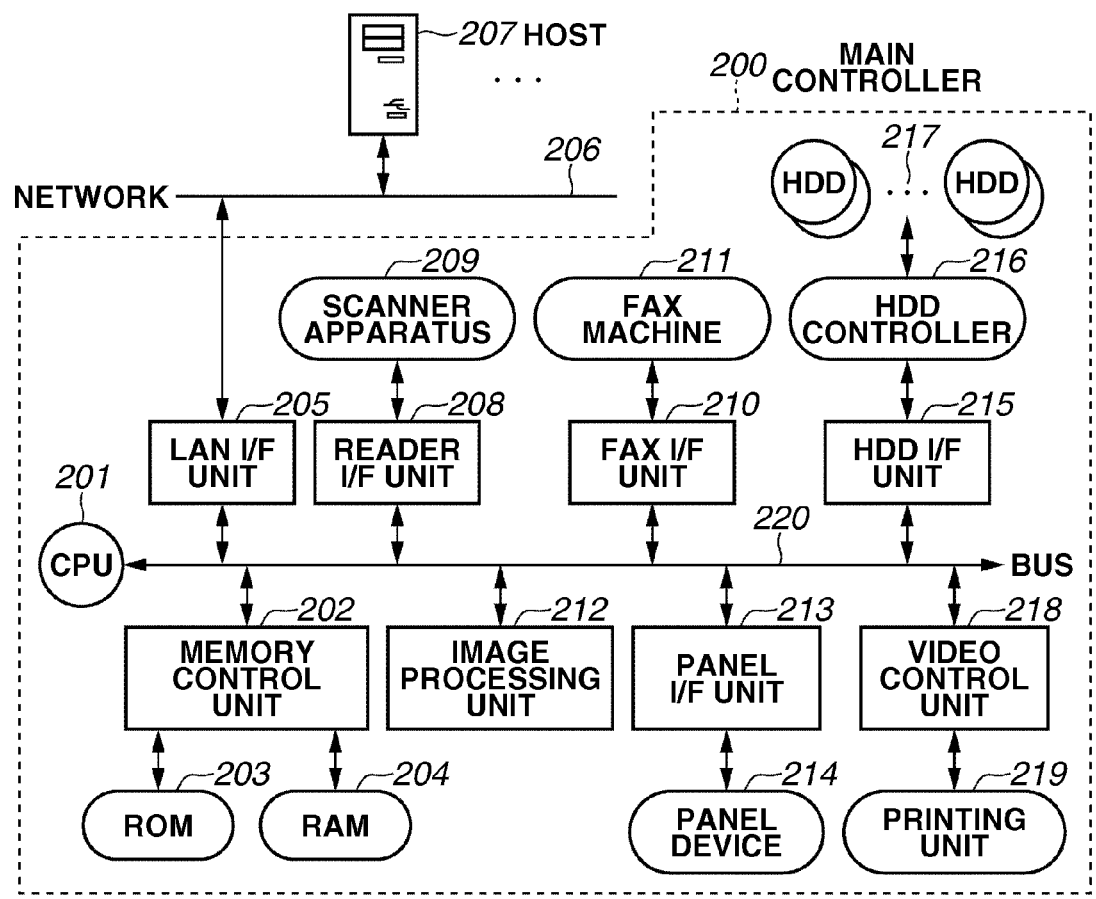
FIG. 1 is a block diagram illustrating an exemplary configuration of an image forming apparatus.

FIG. 1 is a block diagram illustrating an exemplary configuration of an image forming apparatus, to which a memory control apparatus according to a first exemplary embodiment can be applied. In the present exemplary embodiment, a multifunction peripheral (MFP) is used as the image forming apparatus. However, it is also useful if a single function peripheral (SFP) is used as the image forming apparatus.

In the present exemplary embodiment, an HDD controller, which enables an array connection of a plurality of HDDs, and a central processing unit (CPU), which controls the image forming apparatus, are in communication with each other via a system bus 220. In the present exemplary embodiment, a memory device is used as the HDD. However, the HDD according to the present exemplary embodiment is not limited to a memory device. Devices other than the HDD, which can be used as the memory device according to the present exemplary embodiment, will be described below.

Referring to FIG. 1, a main controller 200 controls the entire image forming apparatus. The main controller 200 includes a CPU 201, a read-only memory (ROM) 203, and a random access memory (RAM) 204, which are used in controlling devices connected to the main controller 200 via the system bus 220.

The CPU 201 controls the system and executes computation. The memory control unit 202 controls an input and output to and from various memory devices. In addition, the memory control unit 202 executes direct memory access (DMA) control. The ROM 203, which is a non-volatile memory, stores a boot program and data that is not to be overwritten, such as fonts. If a flash ROM is used, a program and data stored on the ROM 203 can be overwritten.

The RAM 204 is a volatile memory, such as a synchronous dynamic random access memory (SDRAM) or a double data rate (DDR) memory. The RAM 204 is used for temporarily storing data that may be overwritten. More specifically, the RAM 204 is used as a program work area or a temporary storage area for storing print data.

A local area network (LAN) interface (I/F) unit 205 is an interface with a LAN 206, via which the image forming apparatus is connected to a printing apparatus. In general, the LAN I/F unit 205 complies with Transmission Control Protocol/Internet Protocol (TCP/IP). The LAN I/F unit 205 is connected to a network compatible apparatus, such as an external host 207. Via the LAN I/F unit 205, printing can be executed via the LAN 206.

A reader I/F unit 208 controls communication with a scanner apparatus 209. The image forming apparatus implements a copy function by inputting image data scanned by using the scanner apparatus 209. A FAX I/F unit 210 controls communication with a FAX machine 211. The FAX I/F unit 210 transmits and receives FAX data to and from the FAX machine 211, which is connected to a telephone line.

An image processing unit 212 executes image processing on image data input via the LAN I/F unit 205, the reader I/F unit 208, and the FAX I/F unit 210. A panel I/F unit 213 controls communication with a panel device 214. A user can perform an operation for executing various settings and verify a status of the image forming apparatus by operating a hard key (a button) or a soft key displayed on an liquid crystal display (LCD) of the panel device 214. A user interface (UI) (not illustrated) is displayed on the LCD of the panel device 214.

An HDD I/F unit 215 controls an input and an output of data to and from an HDD main controller 216. A plurality of HDDs can be connected to the HDD controller 216. As an advanced technology attachment (ATA) for an HDD, parallel ATA (PATA) and serial ATA (SATA) can be used as its standard. The present exemplary embodiment controls an input and an output of data based on the above-described standard. In addition, if a plurality of HDDs is connected to the HDD controller 216, redundant array of independent disks (RAID) control for mirroring can be executed. An HDD 217, which is a non-volatile mass storage device, stores a file and temporarily stores print data.

A video control unit 218 communicates with a printing unit 219 to transmit a command to the printing unit 219 and receive status information therefrom. Furthermore, the video control unit 218 transmits print data generated and stored on the memory. The printing unit 219, which is a main body of the printing apparatus, prints print data on a print sheet (a recording medium) primarily according to command information from the video control unit 218. In the example illustrated in FIG. 1, a system bus 220 collectively denotes a control bus, a data bus, a local bus provided among arbitrary blocks, and a signal line for easier understanding.

In the present exemplary embodiment, background processing executed on an HDD connected to the HDD controller 216 will be described. Furthermore, in the present exemplary embodiment, it is supposed that an HDD controller is externally connected to the main controller 200 as a separate chip or a board. However, it is also useful if a chip or a board is integrally provided to the main controller 200 as a one-chip controller or an on-board controller. In addition, in the present exemplary embodiment, the following memory control will be described regarding the main controller 200 as a main device for the HDD controller 216.

Figure 2:
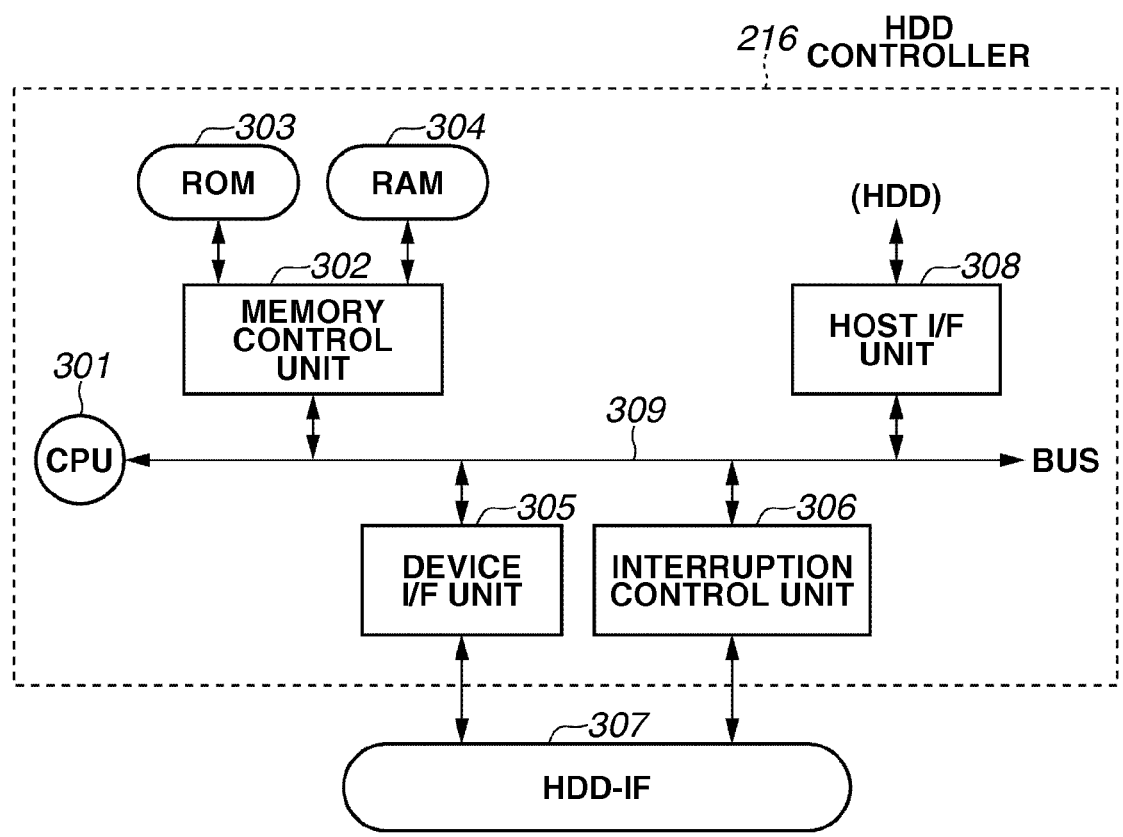
FIG. 2 is a block diagram illustrating an exemplary inner configuration of an HDD controller.

FIG. 2 is a block diagram illustrating an exemplary inner configuration of the HDD controller 216 illustrated in FIG. 1.

Referring to FIG. 2, a CPU 301 executes various control, such as system control or RAID control. In addition, the CPU 301 executes calculation and processes an ATA standard command.

A memory control unit 302 controls an input and output to and from various memory devices and executes DMA control. A ROM 303, which is a non-volatile memory, stores a boot program and data not frequently overwritten or updated, such as a setting value for various modes. If a flash ROM is used instead of the ROM 303, each information described above can be overwritten.

A RAM 304 is a volatile memory, such as a static random access memory (SRAM) or a DDR memory. The RAM 304 is used as a work area for a program and a temporary storage area for temporarily storing data, which is to be overwritten or updated.

An HDD I/F unit 307 is an input/output (I/O) unit for the HDD controller 216, which is connected to the main controller 200. A device I/F unit 305 controls an input and output of an ATA standard device command and data. A host I/F unit 308 controls an input and output of an ATA standard host command and data. The host I/F unit 308 is connected to one or more HDDs.

If a RAID system is to be constructed, a plurality of necessary number of HDDs is connected to the host I/F unit 308 (i.e., two HDDs can be connected for mirroring). In this case, it is useful if a plurality of necessary number of host control circuits is included in the host I/F unit 308.

An interruption control unit 306 controls masking and an output of various interruption signals. In the example illustrated in FIG. 2, a system bus 309 collectively denotes a control bus, a data bus, a local bus provided among arbitrary blocks, and a signal line for easier understanding.

FIG. 3 illustrates an exemplary configuration of a disk array system according to the present exemplary embodiment. In the present exemplary embodiment, mirroring (RAID1) is executed by using two HDDs. "Mirroring" is a method for implementing data security even when a master HDD has failed, by always mirroring (copying) a content stored on the master HDD on a backup HDD. If the master HDD has failed, the backup HDD functions as a master HDD instead of the failed master HDD. Accordingly, the function of the system will not hang up in case of HDD failure.

Referring to FIG. 3, an HDD controller 402 includes one device I/F unit and two host I/F units. In the example illustrated in FIG. 3, a mirroring system includes a main controller 401, which is connected to the device via an SATA cable 405, and the HDD controller 402, which is connected to the host via SATA cables 406 and 407. In addition, two HDDs 403 and 404 are connected to the HDD controller 402.

The main controller 401 recognizes the two HDDs 403 and 404 connected to the HDD controller 402 as one integrated HDD. When a normal access request is given, the main controller 401 does not particularly recognize the actually executed mirroring. In the present exemplary embodiment, it is supposed that if the HDD 403 that functions as a master HDD has failed, the backup HDD 404 is allowed to function as a master HDD to continue the normal system operation.

In this state, a normal sequence for mirroring is broken and disk access processing is continued by using one HDD (the current master HDD 404) only. In the present exemplary embodiment, this state is referred to as a "degraded state".

Furthermore, in the present exemplary embodiment, an operation is executed for restoring the normal state of the mirroring system by exchanging the failed HDD 403 with a new HDD 408 and by copying the content of the current master HDD 404 onto the new HDD 408. In the present exemplary embodiment, the above-described normal condition restoring state is referred to as a "rebuilt state". During the rebuilt state, the single HDD-operating state (abnormal state) of the mirroring state has not been redressed.

In the present exemplary embodiment, mirroring rebuild processing (hereinafter simply referred to as a "rebuild processing") is background processing not recognized by the main controller 401. More specifically, in the rebuild processing, copy processing 410 (processing indicated by using a broken line in FIG. 3) for writing data read from the master HDD 404 onto the backup HDD 408 is executed.

Accordingly, during the rebuild processing, a contention between main (normal) processing 409 (i.e., processing indicated with a solid line in FIG. 3), which is input by the main controller 401, and a read access request for rebuild processing (corresponding to the copy processing 410, which is indicated with the broken line in FIG. 3) on the master HDD 404 may occur. In this case, the performance of the main processing (print processing) may degrade unless the contending accesses are optimized. In the present exemplary embodiment, processing executed in the system is optimized by ensuring a high performance of the main processing requested by the image forming apparatus and achieving a sufficiently high performance of background processing at the same time.

FIGS. 4A through 4D are timing charts illustrating a sequence executed by the memory control apparatus according to the present exemplary embodiment. FIGS. 4A through 4D show how a process is divided to rebuild processing, which is executed by the HDD controller 402 (FIG. 3) on background, and main processing, as one example.

In the present exemplary embodiment, the HDD controller 402 controls memory accesses in parallel while mediating HDD memory access requests for main processing and background processing. Referring to FIGS. 4A through 4D, a solid rectangle 101 denotes a unit of main processing while a shaded rectangle 102 denotes a unit of background processing. In the present exemplary embodiment, background processing for an HDD is described. Accordingly, each unit of processing is shown by a description 117, which indicates a unit 117 for processing one command. If the HDD is compliant with SATA standard, the maximum size of one command is 32 megabyte (MB).

In the present invention, a "unit of processing" is not limited to a unit of processing executed in a system including an HDD. More specifically, in the present invention, a "unit of processing" refers to a unit of general processing.

In the example illustrated in FIG. 4A, which illustrates a pattern P1, an access request by main processing has been issued during background processing and background processing is executed based on a value with which the background processing can be executed with a maximum efficiency. To paraphrase this, the performance of the main processing is not considered in the pattern P1. Accordingly, in this case, the background processing interferes with the main processing at a timing the main processing and the background processing coincide. Therefore, in this case, time 108, which is indicated by a spotted rectangle 108, may be lost. In the present exemplary embodiment, a unit of processing with which background processing can be executed with the maximum efficiency is referred to as a "fastest value unit".

FIG. 4B illustrates a pattern P2. In the pattern P2, the length of time lost due to interference on the main processing by the background processing is reduced. Furthermore, in the pattern P2 illustrated in FIG. 4B, the background processing is executed in the unit of processing with which the high performance of the main processing is achieved. In the present exemplary embodiment, a unit of processing used in this case is referred to as an "optimum value unit" 103.

More specifically, in this case, a little time is lost at a main processing start timing 11. However, if interference by the background occurs, an access permission is given to the main processing within a short period of time after the interference. Accordingly, the main processing is efficiently executed compared with the pattern P1.

On the other hand, because the background processing is executed in the unit of optimum value, the background processing is executed on a piecemeal basis. Accordingly, in the pattern P2, it takes a relatively long time to complete the background processing.

In other words, the background processing, which has been started at a background processing starting timing T0, is completed at a timing T2 in the pattern P1 illustrated in FIG. 4A. On the other hand, in the pattern P2 illustrated in FIG. 4B, it takes more time to complete the background processing.

As described above, during the rebuild processing, restoration to the normal state is not completed. In other words, the abnormal state continues during rebuild processing. Accordingly, if the master HDD 404 fails during this period, the normal state of the mirroring system cannot be restored. Therefore, the above-described risk remains to exist during rebuild processing. Accordingly, it is useful to complete the rebuild processing as soon as possible. However, a latest HDD has a capacity as large as 1 terabyte (TB). Therefore, if the optimum value unit (the size) is small, it may take a very long time to complete the rebuild processing.

In the example illustrated in FIG. 4C, which illustrates a pattern P3, the background processing is executed in the optimum value unit. Furthermore, in the pattern P3, the interval between accesses by the main processing is larger than those in the patterns P1 and P2.

In the pattern P3, the number of times of interference by the background processing is larger than that in the pattern P2 illustrated in FIG. 4B. Accordingly, the performance of executing the main processing degrades. In actual processing, the access requests are seldom given at the regular interval as in the patterns P2 or P3 due to the timing of executing the processing by the main controller 401. In other words, in actual processing, access requests are generally given in a lump at irregular intervals.

FIG. 4D illustrates a pattern P4, which corresponds to a method according to the present invention capable of solving the above-described problems. More specifically, in the pattern P4 illustrated in FIG. 4D, in view of the processing executed at the main processing start timing T1 and beyond, except for the collision with the background processing at the head, the main processing is executed at the fastest processing speed of all the patterns illustrated in FIGS. 4A through 4D.

More specifically, in the pattern P4, the HDD controller 402 monitors the status of the main processing and sets and variably uses the unit of processing including a first unit of processing and a second unit of processing. The interval between accesses by the main processing is the same as that of the pattern P3 illustrated in FIG. 4C.

After processing a first request of access by the main processing, the HDD controller 402 delays the background processing by a predetermined wait time 110. If a request of access by main processing is issued during the wait time 110, the HDD controller 402 clears the count of the wait time 110 and executes the current main processing.

After that, similarly, in the pattern P4 illustrated in FIG. 4D, a next access and beyond by the main processing continuously occurs within each wait time immediately before a timing of executing the main processing by the unit of main processing 111. Therefore, the background processing cannot interrupt.

Suppose that one unit of processing by the main controller 401 includes main processing accesses 109 and 111. In this case, the wait time, which is counted immediately after completing the last access by main processing 111, is to be counted until a predetermined time. After that, the delayed background processing is resumed.

More specifically, in resuming the delayed background processing, the HDD controller 402 resumes the background processing in the optimum value unit 112. After that, the HDD controller 402 counts the processing by the predetermined optimum value unit 112 N times. Subsequently, the HDD controller 402 continues the background processing in a fastest value unit 114. In the present exemplary embodiment, the optimum value unit 112 implements a first unit of processing while the fastest value unit 114 implements a second unit of processing.

In the present exemplary embodiment, in the pattern P4 illustrated in FIG. 4D, the background processing, which has been started at the timing T0, is completed at a background processing end timing T3. On the other hand, in the pattern P3 illustrated in FIG. 4C, it takes a very long time to complete the background processing because the background processing is always executed in the optimum value unit.

In the pattern P4 illustrated in FIG. 4D, the HDD controller 402 starts the background processing at the background processing start timing T0 in the optimum value unit 112. In this case, the HDD controller 402 continues the background processing in the fastest value unit 114 after counting the processing in the optimum value unit 112 N times, as illustrated as a number of counts 116 in FIG. 4D.

Although not illustrated in FIG. 4, if the main processing interrupts the background processing while counting for the background processing in the optimum value unit 112 is currently executed, then the HDD controller 402 starts the interrupting main processing when the current unit of background processing is completed. In this case, the HDD controller 402 repeats the above-described sequence (i.e., the HDD controller 402 counts the processing in the optimum value unit 112 N times after the wait time).

If the interval between accesses by the main processing in the unit of main processing is longer than the wait time, the background processing in the optimum value unit 112 or the fastest value unit 114 may interrupt. As described above, the main controller 401 recognizes the HDD controller 402 as one integrated HDD. On the other hand, the HDD controller 402 is not capable of recognizing the progress of processing by the main controller 401 (i.e., does not recognize a break between processing).

Accordingly, the HDD controller 402 cannot predict the timing of accesses by the main processing. Furthermore, the HDD controller 402 cannot predict the interval of accesses by the main processing either.

The present exemplary embodiment suppresses interference by an aggregate of accesses by main processing given by the main controller 401 to a minimum by using the wait time 110, which is set between accesses by the main processing. In addition, if each interval between the aggregate of accesses by the main processing is large (i.e., longer than the wait time), then the HDD controller 402 can insert the background processing into the time period corresponding to the interval as N times of background processing in the optimum value unit 112 and as the background processing in the fastest value unit 114. Accordingly, the present exemplary embodiment is capable of optimizing the efficiency of the background processing without degrading the processing efficiency (the required performance) of the processing by the main controller 401.

If it is not necessary to control the wait time and the count value N used for counting the optimum value unit 112, it is also useful if the HDD controller 402 omits a part of or the entire sequence by setting a value "0" for the wait time and the count value N. More specifically, if a value "0" is set to both of the values of the wait time and the count of the optimum value unit 112, the pattern P1 illustrated in FIG. 4A applies. On the other hand, if the wait time has the value "0" and the count of the optimum value unit 112 has the value "N", then the pattern P2 illustrated in FIG. 4B or the pattern P3 illustrated in FIG. 4C applies. In the latter case, if no access by the main processing occurs while counting the processing in the optimum value unit 112 N times, then the HDD controller 402 continues the remaining portion of the background processing in the fastest value unit 114.

Figure 5:
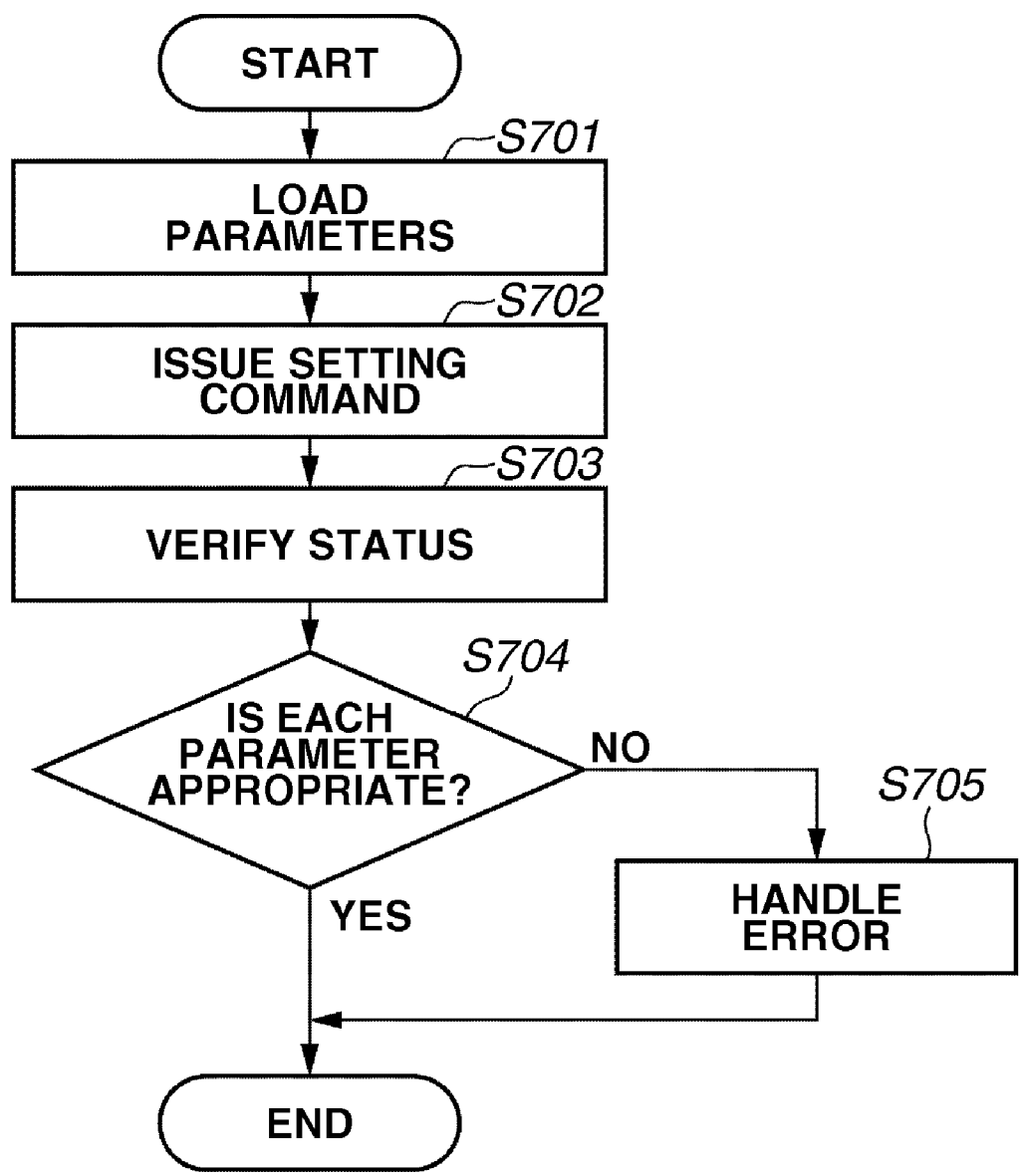
FIG. 5 is a flow chart illustrating an example of data processing executed by the image forming apparatus.

FIG. 5 is a flow chart illustrating an example of processing for setting a parameter, which is executed by the main apparatus according to the present exemplary embodiment. More specifically, the example illustrated in FIG. 5 illustrates an exemplary method for setting background processing parameters for the optimum value, the fastest value, the wait time, and the optimum value count value N to the HDD controller 216. Processing in each of steps S701 through S705 is implemented by the CPU 201 by loading and executing a control program from the ROM 203.

Referring to FIG. 5, in step S701, the CPU 201 loads a parameter necessary for executing disk control on the RAM 204. Then the processing advances to step S702. In the present exemplary embodiment, a parameter includes an optimum value, a fastest value, a wait time, and an optimum value count value N for the background processing.

In step S702, the CPU 201 gives an initial setting command to the CPU 301 of the HDD controller 402. When the initial setting command is received, the CPU 301 of the HDD controller 402 sets an initial value to each parameter managed and stored on the RAM 304.

In step S703, the CPU 201 verifies the status of each parameter. In step S704, the CPU 201 determines whether an appropriate setting is set for each parameter. If it is determined that the setting value is different from an expected value (NO in step S704), then the processing advances to step S705. In step S705, the CPU 201 executes predetermined error handling, such as retry. Then the processing ends.

On the other hand, if it is determined that the value set to each parameter is appropriate (YES in step S704), then the processing ends. In this case, the CPU 201 executes control for shifting the operation mode of the device to a standby state and starts processing in the system. It is also useful if the set value of each parameter is changed at an arbitrary timing except when the background processing is currently executed.

Now, memory control processing according to the present exemplary embodiment will be described in detail later below with reference to FIGS. 6 and 7. FIG. 6 is a flow chart illustrating an example of processing executed by the memory control apparatus.

More specifically, FIG. 6 illustrates exemplary background processing, such as rebuild processing executed by the HDD controller 216. In other words, the exemplary processing illustrated in FIG. 6 is processing executed when no access by the main processing by the main controller 200 is executed. Processing in each of steps S801 through S807 is implemented by the CPU 301 by loading and executing a control program from the ROM 303 on the RAM 304.

Referring to FIG. 6, in step S801, the CPU 301 initializes a counter n, which is used for counting processing in the optimum value unit 112 managed and stored on the RAM 304, with a value "0". In step S802, the CPU 301 starts the background processing in the optimum value unit 112.

In step S803, every time a unit of background processing is completed, the CPU 301 compares the value N of the number of times of processing, which is initially set, with the counter n and determines whether n=N. If it is determined that n N (NO in step S803), then the processing advances to step S804. In step S804, the CPU 301 increments the counter n by 1. Then the processing returns to step S803.

On the other hand, if it is determined that n=N (YES in step S803), then the processing advances to step S805. In step S805, the CPU 301 changes the unit of processing from the optimum value unit 112 to the fastest value unit 114. In step S806, the CPU 301 continues the background processing. In step S807, the CPU 301 completes the background processing in the fastest value unit 114. Then the processing ends.

Figure 7B:
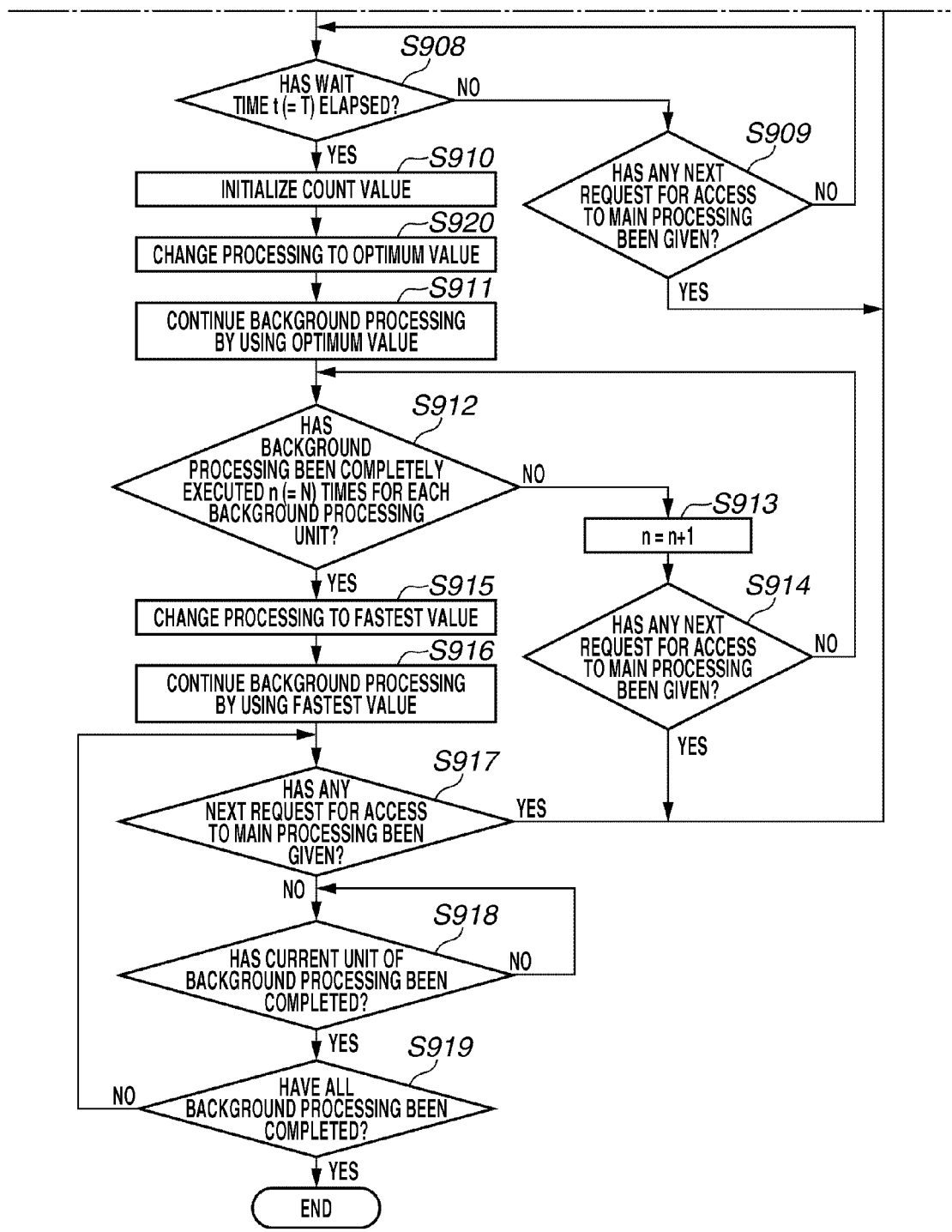
FIG. 7 is a flow chart illustrating an example of processing executed by the memory control apparatus.

In the example illustrated in FIG. 6, processing continuing from the processing in step S806, which is processing illustrated in FIG. 7 and executed when an access by the main processing is performed, is indicated with an asterisk.

FIG. 7 is a flow chart illustrating an example of processing executed by the memory control apparatus according to the present exemplary embodiment. More specifically, FIG. 7 illustrates exemplary background processing, such as rebuild processing executed by the HDD controller 216. In other words, the exemplary processing illustrated in FIG. 7 is processing executed when an access by the main processing by the main controller 200 is executed. Processing in each of steps S901 through S919 is implemented by the CPU 301 by loading and executing a control program from the ROM 303 on the RAM 304.

Referring to FIG. 7, in step S901, the CPU 301 executes the background processing illustrated in FIG. 6. In step S902, if an access by the main processing is executed during the background processing, then the processing advances to step S903. In step S903, the CPU 301 determines whether the unit of the currently executed background processing is completed. If it is determined that the unit of the currently executed background processing is completed (YES in step S903), then the processing advances to step S904.

In step S904, the CPU 301 starts the main processing requested by the CPU 201 of the main controller 200. In step S905, the CPU 301 determines whether a unit of the main processing has been completely executed. If it is determined that a unit of the main processing has been completely executed (YES in step S905), then the processing advances to step S906. In step S906, the CPU 301 initializes a wait time t with the value "0". Then, the processing advances to step S907.

In step S907, the CPU 301 starts counting the time until a predetermined wait time T by using a counter (not illustrated). In step S908, the CPU 301 determines whether the predetermined wait time has elapsed (i.e., whether t=T). If it is determined that the predetermined wait time has elapsed (i.e., that t=T) (YES in step S908), then the processing advances to step S910. On the other hand, if it is determined that the predetermined wait time has not elapsed yet (i.e., whether t T), then the processing advances to step S909.

In step S909, the CPU 301 determines whether a request of a next access by the main processing has been issued. If it is determined that a request of a next access by the main processing has been issued (YES in step S909), then the processing returns to step S904. In this case, the CPU 301 repeats a series of main processing insteps S904 through S908. To paraphrase this, while determining whether the predetermined time has elapsed, the CPU 301 executes control for determining whether to continue the main processing (or resuming the delayed background processing).

On the other hand, if it is determined that no request of a next access by main processing has not been executed (NO in step S909), then the processing returns to step S908. If it is determined that the wait time T has elapsed (i.e., if it is determined that t=T), then the processing advances to step S910. In step S910, the CPU 301 initializes the counter n, which indicates the number of times of the background processing in the optimum value unit 112, with a value "0". In step S920, the CPU 301 changes the unit of processing from the fastest value unit 114 to the optimum value unit 112. In step S911, the CPU 301 continues the background processing in the optimum value unit 112.

During continuing background processing, in step S912, the CPU 301 determines whether N units of the background processing have been completed (i.e., whether n=N). If it is determined that N units of the background processing have not been completed yet (i.e., that n N) (NO in step S912), then the processing advances to step S913. In step S913, the CPU 301 increments the counter n for counting the number of times of processing in each optimum value unit 112 by 1 (n=n+1).

In step S914, the CPU 301 compares the counter n with a predetermined upper limit N of the number of times of background processing and determines whether an access by the main processing has been executed during the time in which the counter n is smaller than N. If it is determined that an access by the main processing has been executed during the above-described time (YES in step S914), then the processing returns to step S904 and starts the main processing. On the other hand, if it is determined that no access by the main processing has been executed during the above-described time (NO in step S914), then the processing returns to step S912.

On the other hand, if it is determined that the counter n=N (YES in step S912), then the processing advances to step S915. In step S915, the CPU 301 changes the unit of processing from the optimum value unit 112 to the fastest value unit 114. In step S916, the CPU 301 continues the subsequent part of the background processing in the fastest value unit 114.

In step S917, the CPU 301 determines whether an access by the main processing has been executed. If it is determined that an access by the main processing has been executed (YES in step S917), then the processing returns to step S904 and starts the main processing. On the other hand, if it is determined that no access by the main processing has been executed (NO in step S917), then the CPU 301 executes the background processing in the fastest value unit 114 and the processing advances to step S918.

In step S918, the CPU 301 determines whether the background processing executed in the fastest value unit 114 has been completed. If it is determined that the background processing executed in the fastest value unit 114 has been completed (YES in step S918), then the processing advances to step S919. In step S919, the CPU 301 determines whether all the background processing has been completed. If it is determined that not all the background processing has been completed (NO in step S918), then the processing returns to step S917. In this case, the CPU 301 keeps monitoring whether an access by the main processing has been executed in the unit of background processing until the background processing is completed.

On the other hand, if it is determined that an access by the main processing has been executed (YES in step S917), then the processing returns to step S904. In this case, the CPU 301 repeats the above-described processing sequence. On the other hand, if it is determined that all the background processing has been completed (YES in step S919), then the processing ends.

The above-described exemplary embodiment of the present invention is implemented in the system that includes an HDD. However, the present invention is not limited to this. More specifically, the exemplary embodiment of the present invention having the configuration described above can be implemented in a system that includes a storage device other than the HDD.

In other words, the present invention can be applied to an arbitrary system that includes a storage device other than the HDD and configured to execute primary main processing and background processing. More specifically, a solid state drive (SSD) can be used as an example of the storage device other than the HDD.

Other Embodiments

Aspects of the present invention can also be realized by a computer of a system or apparatus (or devices such as a CPU or MPU) that reads out and executes a program recorded on a memory device to perform the functions of the above-described embodiment (s), and by a method, the steps of which are performed by a computer of a system or apparatus by, for example, reading out and executing a program recorded on a memory device to perform the functions of the above-described embodiment (s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2009-220830 filed Sep. 25, 2009, which is hereby incorporated by reference herein in its entirety.

What is claimed is:

1. A control apparatus connected to a processing apparatus, a first storage device, and a second storage device and capable of executing first processing for transferring data to be copied from the first storage device to the second storage device and second processing for transmitting a request of access by the processing apparatus to requested data stored on the first storage device in parallel, the control apparatus comprising a control unit configured, if the second processing is executed in parallel to the first processing, to execute control for executing the first processing in a first unit of processing, if the second processing is not executed in parallel to the first processing, to execute control for executing the first processing in a second unit of processing, which is larger than the first unit of processing.

2. The control apparatus according to claim 1, wherein the control unit is configured, if data to be used in the second processing is not input after a predetermined time has elapsed when the second processing is executed in a predetermined unit of processing, to execute control for executing the first processing in the first unit of processing.

3. The control apparatus according to claim 2, wherein the control unit is configured, if data to be used in the second processing is not input after executing the first processing in the first unit of processing for a predetermined number of times, to execute control for executing the first processing in the second unit of processing.

4. A system including the control apparatus, the processing apparatus, the first storage device, and the second storage device according to claim 1.

5. A method for controlling a control apparatus connected to a processing apparatus, a first storage device, and a second storage device and capable of executing first processing for transferring data to be copied from the first storage device to the second storage device and second processing for transmitting a request of access by the processing apparatus to requested data stored on the first storage device in parallel, the method comprising:

executing, if the second processing is executed in parallel to the first processing, control for executing the first processing in a first unit of processing; and executing, if the second processing is not executed in parallel to the first processing, control for executing he first processing in a second unit of processing, which is larger than the first unit of processing.

6. A computer-readable storage medium storing instructions which, when executed by a control apparatus connected to a processing apparatus, a first storage device, and a second storage device and capable of executing first processing for transferring data to be copied from the first storage device to the second storage device and second processing for transmitting a request of access by the processing apparatus to requested data stored on the first storage device in parallel, cause the control apparatus to perform operations comprising:

executing, if the second processing is executed in parallel to the first processing, control for executing the first processing in a first unit of processing; and executing, if the second processing is not executed in parallel to the first processing, control for executing the first processing in a second unit of processing, which is larger than the first unit of processing.

* * * * *